R. S. PEASE & J. A. SWEET.
APPARATUS FOR THE MANUFACTURE OF WINDOW GLASS.
APPLICATION FILED NOV. 7, 1908.
946,921. Patented Jan. 18, 1910.
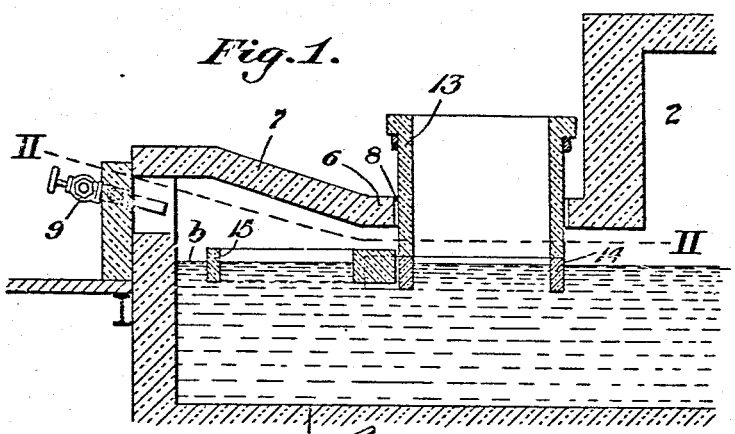
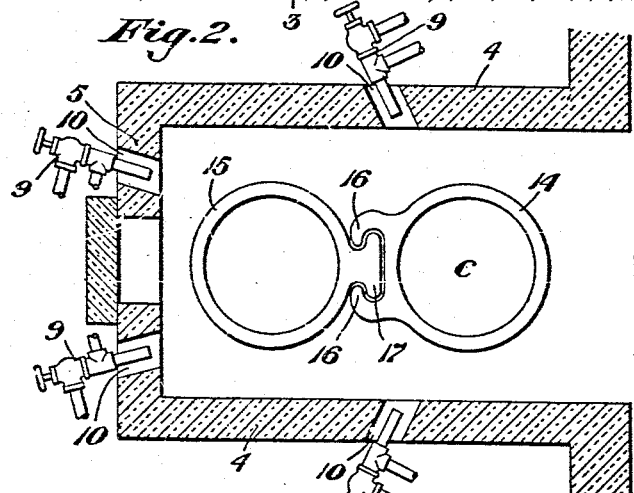
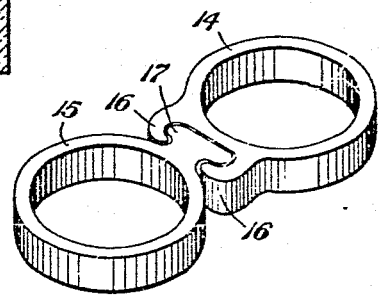
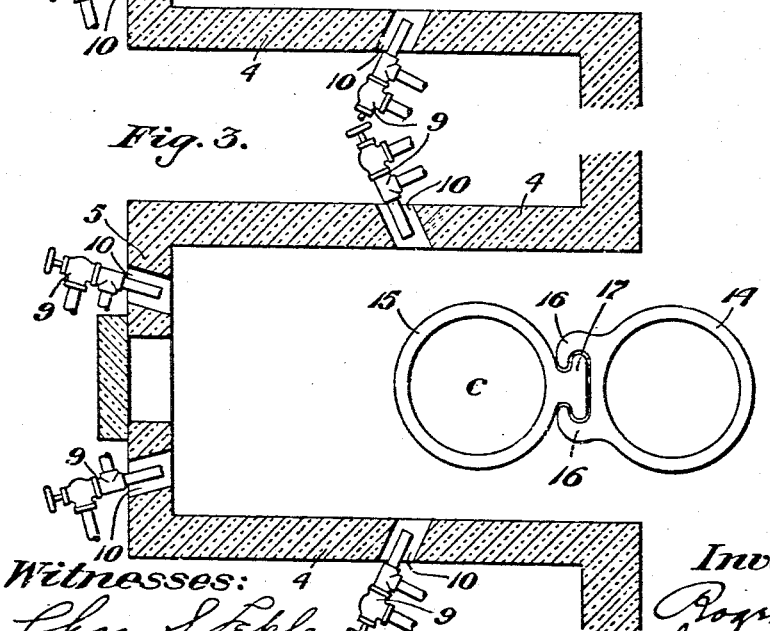
Witnesses:
Inventors:
Roger S. Pease
John A. Sweet
by C. M. Clarke
Their Attorney

UNITED STATES PATENT OFFICE.

ROGER S. PEASE AND JOHN A. SWEET, OF HARTFORD CITY, INDIANA, ASSIGNORS TO ALFRED M. LEE, TRUSTEE, OF PITTSBURG, PENNSYLVANIA.

APPARATUS FOR THE MANUFACTURE OF WINDOW-GLASS.

946,921.  Specification of Letters Patent.  Patented Jan. 18, 1910.

Application filed November 7, 1908. Serial No. 461,485.

*To all whom it may concern:*

Be it known that we, ROGER S. PEASE and JOHN A. SWEET, citizens of the United States, residing at Hartford City, in the county of Blackford and State of Indiana, have invented certain new and useful Improvements in Apparatus for Manufacturing Window-Glass, of which the following is a specification, reference being had therein to the accompanying drawing.

Our invention refers to improvements in the manufacture of window glass and is particularly designed for the purpose of providing means for facilitating the drawing of cylinders from a body of molten glass in a tank, pot, or any suitable containing vessel, and consists of a double ring composed of two freely connected rings adapted to be used upon the surface of the glass to be drawn to segregate a portion thereof within a limited zone for the purpose of eliminating impurities, providing a smooth, clean surface of pure glass adapted to be shifted about beneath the drawing opening, or a protecting vertically adjustable shell therein to provide communication with the lower interior of the glass-containing vessel for the drawing tool and to be utilized for removing the surplus glass after the drawing operation to a lateral position for re-melting.

In the drawings: Figure 1 is a vertical sectional view through the glass-containing compartment of a melting tank illustrating the device in position for drawing. Fig. 2 is a sectional view indicated by the line II. II. of Fig. 1. Fig. 3 is a similar view showing the connected rings in a different position. Fig. 4 is a perspective view of the companion rings assembled.

Our invention is designed for use with any suitable glass-containing vessel or preferably in combination with a tank extension wherein the body of glass from which the cylinders are drawn is in constant open communication with the main tank.

In the drawings, 2 represents the main tank of well known construction, usually rectangular in form provided with the customary side and end walls, a charging opening for the batch and any suitable means for supplying fuel to the interior, as by gas pipes not herein shown and of well known construction. The glass is drawn upwardly from a tank extension extending outwardly beyond the end or side of the main tank having a floor 3 substantially on the same general level as the floor of the main tank and bounded within side walls 4 and an end wall 5. Said tank extension is covered at the portion adjacent to the main tank by a straight preferably arched roof or cover portion 6, the cover sloping upwardly and outwardly toward the outer end as indicated at 7, whereby the inner cover is located somewhat closely adjacent to the surface *b* of the glass for the drawing operation and is provided with a circular opening 8 for such purpose. The cavity beneath the outer portion of the cover is also thus enlarged vertically for clearance of the fuel supply burners, insertion of manipulating tools for handling the rings, removal of impurities, etc.

The burners are indicated by the numeral 9, referring to any suitable fuel-supplying device as air and oil burners inserted through openings 10 at any suitable point or points and preferably directed inwardly and downwardly toward the point *c* indicating the center of the drawing operation. Any desired number of such jets may be introduced through the end or side walls or both, and when so arranged will operate to keep the contents of the tank extension at any desired heat for drawing, supplementing the heat of the main tank, while the amount of fuel discharged may be accurately controlled and varied from time to time through one or more of the burner jets for the purpose of temporary rapid heating of the glass as desired, or for melting any adhering glass from the vertically adjustable ring.

For the purpose of protecting the cylinder-in-process from surrounding impurities, variations in the heat, air currents, etc., and for coöperation with one of the floating rings to insure a continuous supply of heated glass from below, we employ a vertically adjustable ring 13 of fire-clay or other vitreous material arranged for raising or lowering through opening 8 by any suitable means.

For the purpose of providing a segregated portion of clean glass, we have provided the pair of interlocking companion rings 14, 15, adapted to be pushed or pulled together to locate one or the other of them immediately beneath the ring 13 as in Fig. 1, the other ring being located in front of or behind said vertically adjustable ring, according to which of the companion rings 14 or 15 is used. Said companion rings are coupled together by means of a freely sliding dove-tail or male-and-female joint as indicated, ring 14 having embracing portions 16, 16, adapted to engage a projecting key or interlocking lug 17, said parts being so proportioned that one will engage the other and maintain the rings in longitudinal relation with each other, preventing separation when floating upon the surface of the glass, but permitting one ring to be depressed or elevated independent of the other.

As thus constructed and assembled, the rings are located within the glass-containing chamber as shown and are readily manipulable by any suitable tool, as a hooked rod, through the opening in the front wall, and one or the other of the rings may be located beneath the vertically adjustable ring 13 for each drawing operation, as indicated in Fig. 1. When the drawing operation has been performed through said coöperating ring, and the surplus glass has been dropped back into floating ring 14 after severance from the completed cylinder, ring 15 is advanced into register with ring 13, ring 14 and its contained partly-melted surplus being carried outwardly toward the main tank and into subjection of the heat therein. The next operation is now performed through rings 13 and 15, the surplus glass being melted within ring 14 so that at the next operation, fresh melted glass will be prepared and the operation is again repeated upon re-locating the rings by drawing them backwardly.

A particular advantage of the companion ring construction is that each ring when located beneath the vertically adjustable protecting ring 13 forms a continuation thereof, presents a clean fresh surface of glass to be drawn from, the continuous drawing utilizing the glass from the lower portion of the containing vessel. By reason of the free and easily working joint, the particular ring underneath the protecting ring 13 may be depressed or further submerged into the glass, due to the weight of said ring, without affecting the other ring, and as thus constructed the device will be found to provide an easy, simple and convenient means for the purpose of bringing portions of the glass into register with the drawing opening.

The rings themselves are of easy and cheap manufacture, one or the other may be renewed if broken; while their efficiency for the purposes intended will greatly facilitate the operation of making mechanically drawn cylinders.

Having described our invention, what we claim is:—

1. A glass containing vessel having an upper drawing opening, and a pair of freely connected interlocking companion rings arranged for flotation and location as to one of said rings beneath said opening, substantially as set forth.

2. A glass containing vessel having an upper drawing opening, a vertically adjustable shell therein, and a pair of freely connected interlocking companion rings arranged for flotation and location as to one of said rings, beneath said opening, substantially as set forth.

3. Companion rings for the purpose set forth, the one having a locking projection and the other having an inter-engaging portion adapted to interlock therewith to prevent lateral separation, substantially as set forth.

4. Companion rings for the purpose set forth, the one having a locking projection and the other having an inter-engaging portion adapted to interlock therewith, with intervening clearance for relative vertical movement, substantially as set forth.

In testimony whereof we affix our signatures in presence of two witnesses.

ROGER S. PEASE.
JOHN A. SWEET.

Witnesses:
FRED W. WILLMAN,
DAVID C. CALDWELL.